US012602445B2

(12) United States Patent
Mehanna et al.

(10) Patent No.: US 12,602,445 B2
(45) Date of Patent: Apr. 14, 2026

(54) QUERY COMPLETION BASED ON LOCATION

(71) Applicant: Microsoft Technology Licensing, LLC, Redmond, WA (US)

(72) Inventors: Hussein Mohamed Mehanna, Redmond, WA (US); Tabreez Govani, Bellevue, WA (US); Jun Wang, Bellvue, WA (US); Kun Jing, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/636,065

(22) Filed: Apr. 15, 2024

(65) Prior Publication Data

US 2024/0256621 A1     Aug. 1, 2024

Related U.S. Application Data

(60) Continuation of application No. 17/690,189, filed on Mar. 9, 2022, now Pat. No. 11,960,558, which is a continuation of application No. 16/385,983, filed on Apr. 16, 2019, now Pat. No. 11,275,808, which is a continuation of application No. 14/721,789, filed on May 26, 2015, now Pat. No. 10,303,804, which is a division of application No. 13/233,772, filed on Sep. 15, 2011, now abandoned.

(51) Int. Cl.
| | |
|---|---|
| *G06F 16/00* | (2019.01) |
| *G06F 16/2457* | (2019.01) |
| *G06F 16/332* | (2019.01) |
| *G06F 16/9535* | (2019.01) |
| *G06F 16/9537* | (2019.01) |

(52) U.S. Cl.
CPC .... *G06F 16/9537* (2019.01); *G06F 16/24578* (2019.01); *G06F 16/3322* (2019.01); *G06F 16/9535* (2019.01)

(58) Field of Classification Search
CPC ........... G06F 16/9537; G06F 16/24578; G06F 16/3322; G06F 16/9535
See application file for complete search history.

*Primary Examiner* — Paul Kim

(74) *Attorney, Agent, or Firm* — Shook, Hardy & Bacon L.L.P.

(57) ABSTRACT

Systems, methods, and computer storage media having computer-executable instructions embodied thereon that return query completions are provided. A user of a computing device like a mobile phone may enter a prefix. In turn, the prefix and location information associated with the device are transmitted to a server device. The server device receives the prefix and location information. The prefix and the location information are matched with names and locations of entities stored in a database connected to the server device. The server device transmits query completion data to the mobile device. The query completion data includes one or more names that complete the received prefix. The names provided by the server device may be associated with entities that are within a threshold radius of the location information.

20 Claims, 8 Drawing Sheets

QUERY COMPLETION BASED ON LOCATION

CROSS-REFERENCE TO RELATED APPLICATIONS

This application is a continuation of U.S. patent application Ser. No. 17/690,189, filed on Sep. 9, 2022, which itself is a continuation of U.S. patent application Ser. No. 16/385,983, filed Apr. 16, 2019, now U.S. Pat. No. 11,275,808, which is a continuation of U.S. patent application Ser. No. 14/721,789, filed May 26, 2015, now U.S. Pat. No. 10,303,804, which is a divisional application of U.S. patent application Ser. No. 13/233,772, filed Sep. 15, 2011, all of which are incorporated herein by reference in their entireties.

BACKGROUND

Conventional search engines receive requests from users that are seeking information. The requests are formulated on computing devices used by the users. The computing devices may include input interfaces, e.g., touch screens, keyboards, keypads, etc., that receive the requests. Users may have difficulty entering the requests into the conventional input interfaces because of disabilities associated with the user, large fingers, or awkward configurations for the conventional input interfaces.

Some conventional computing devices are configured to provide query suggestions to the user based on the number of characters received from the input interface. Because typing is difficult with small keypads and small fonts, query suggestions allow the user to quickly enter items and reduce the number of characters that a user needs to type. At times, e.g., when the user is stressed for time, such query-inputting can also be problematic. This is particularly true when the user is engaged in search behavior on a computing device that is a small mobile device, where alpha-numeric textual input may be more difficult for some users.

For instance, a user may type "Br" in the input interface and the computing device may return query suggestions, such as "Bristol," "Brooklyn," "Bravo," or "Broken." The query suggestions are received from the conventional search engine. The conventional search engine receives the characters "Br" and identifies queries from its query log that partially match "Br." In turn, the queries are transmitted to the user as query suggestions.

The conventional search engine generates suggestions that are agnostic of the location associated with the user. The suggestions received by the conventional computing device may be ranked based on query frequency. However, the suggestions are not ranked based on location. For instance, the conventional query suggestions may include entities from locations far from the current location of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention relate to providing query completions based on a prefix and location entered by the user. While the user is entering a query but before the user submits a completed query for a search to be performed, query completions are identified by a search engine. The query completions may be ranked. In one embodiment, query completions are for entities, such as restaurants and bars. The query completions for these entities may be ranked based on location and popularity. The query completions are provided to the user.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION

Figure 1:
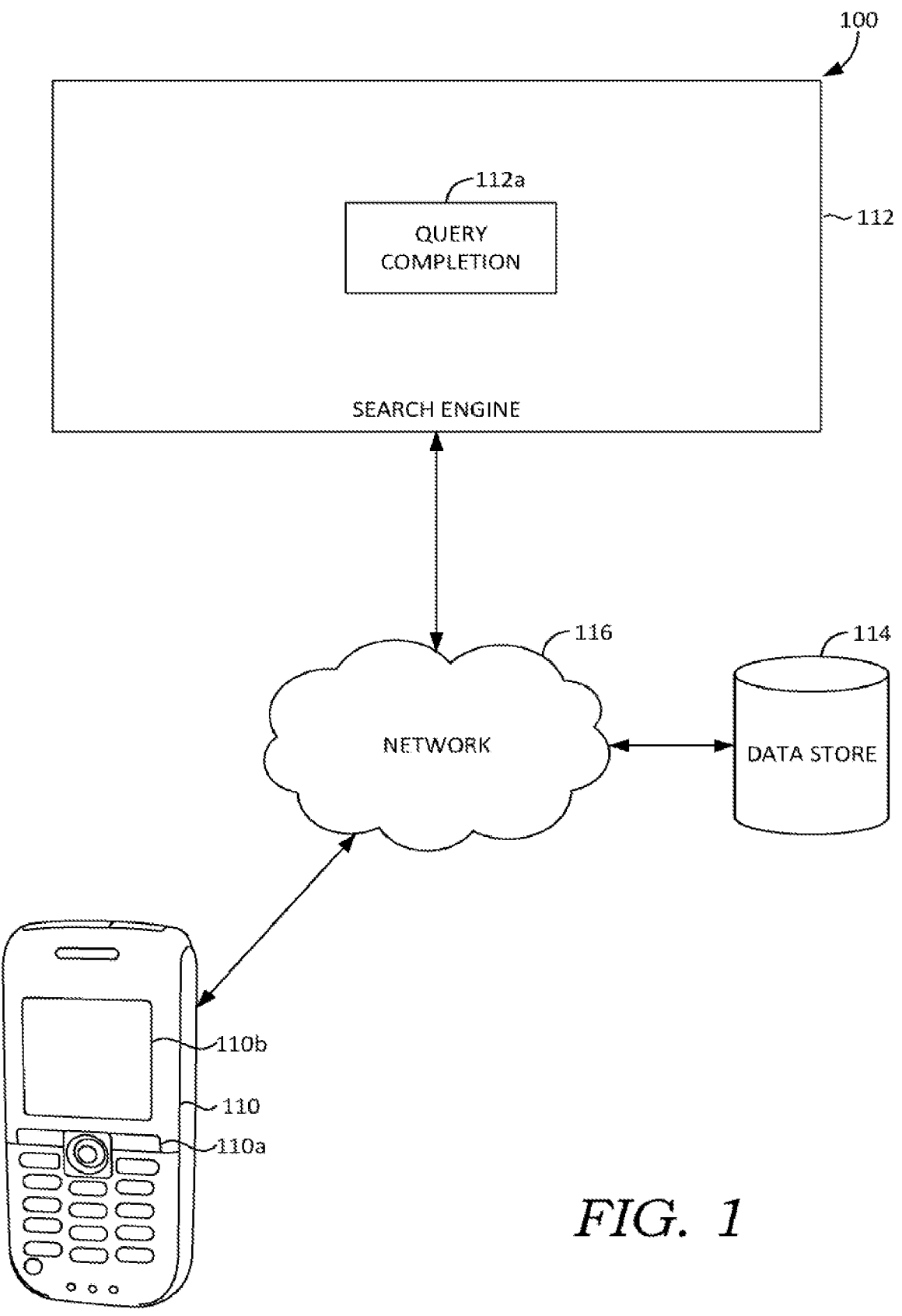
FIG. 1 is a block diagram of an exemplary computing system environment suitable for use in implementing embodiments of the invention.

The subject matter of the embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention are generally directed to providing query completions to a user. The query completions are received from a search engine. The search engine includes a completion component that performs a partial match on an entity database to provide the names of entities that match a query prefix and location received from the user. The query completions are provided to the user while the user is entering the query prefix but before the query is completed and submitted to the search engine by the user for a search to be performed. As a user incrementally enters each character of the prefix of a query, query completion data is received and updated as the prefix of the query changes. For instance, if the user intends to enter the search query "computer," the query completions are received as the user updates the prefix as follows: "c," "co," "com," "comp," "compu," "comput," "compute," and "computer." As each query prefix is received, query completions are determined by the completion component. In turn, the query completions are transmitted to the user as the user types in additional characters of the query.

As used herein, the term "query completion" refers to a portion of the query that is selected based on a received prefix and provided to the user for performing a search. By way of example, if the user has typed "co," the query completions may include, for instance, "coffee, "computer," "condo," "cobalt," "columbia," "cocoa," and "Colorado," "corner store," "cover," etc. In some instances, the query completion includes the string from the query portion (i.e., "co") at the beginning and may include entities that are located within a threshold radius of the user that provided the prefix. By presenting query completions as the user is entering the query prefix, the user does not need to complete entering the entire query or the user may be presented with a query the user prefers over what the user originally intended to enter. The user may select the query and cause a search to be performed using the selected query.

In accordance with some embodiments of the invention, query completions are selected from an entity database that is accessible by a search engine server. Among possible other information, the entity database includes the name and address of entities in various regions of the world. When the user is entering a query prefix, a query completion is received that may include the names of one or more entities that are a partial match on the prefix. The one or more names are returned to the user as query completions. The query completions that match the queries may be narrowed down based on the location of the user.

Accordingly, embodiments of the invention provide a search engine that is configured to efficiently provide query completions based on location, e.g., longitude and latitude of the user. The longitude and latitude of the user is provided to the search engine by the computing device. This allows the search engine to target results to specific locations associated with the user. For instance, the location data may specify a neighborhood. The query completions that are returned may be limited by both location and prefix. The entities that start with the prefix and closest to the user may be included in the query completions. In some embodiments, a radius for the matching location is adjusted based on the result size to maintain efficient completion of the prefix at typing speed. Thus, query completions returned to the user may include the names of local entities, stores, food trucks, salons, spas, restaurants, which partially match a prefix entered by the user.

In one embodiment, the user provides a prefix via a computing device. The prefix and a location of the user are transmitted to a search engine that includes a query completion component. The query completion component receives the prefix and location and identifies entities that match the prefix and location. The query completion component returns the matching entities as query completions to the computing device.

FIG. 1 is a block diagram of an exemplary computing system environment 100 suitable for use in implementing embodiments of the invention. The computing system environment 100 includes a computing device 110, a search engine 112, a data store 114, and a network 116. It will be understood and appreciated by those of ordinary skill in the art that the computing system environment 100 shown in FIG. 1 is merely an example of one suitable computing system environment and is not intended to suggest any limitation as to the scope of use or functionality of embodiments of the invention. Neither should the computing system environment 100 be interpreted as having any dependency or requirement related to any single module/component or combination of modules/components illustrated therein.

The computing system environment 100 includes a computing device 110, a search engine 112, and a data store 114, all in communication with one another via a network 116. The network 116 may include, without limitation, one or more local area networks (LANs) and/or wide area networks (WANs). Such networking environments are commonplace in offices, enterprise-wide computer networks, intranets, and the Internet. Accordingly, the network 116 is not further described herein.

In some embodiments, one or more of the illustrated components/modules may be implemented as stand-alone applications. In other embodiments, one or more of the illustrated components/modules may be integrated directly into the operating system of the search engine 112 and/or the computing device 110. It will be understood by those of ordinary skill in the art that the components/modules illustrated in FIG. 1 are exemplary in nature and in number and should not be construed as limiting. Any number of components/modules may be employed to achieve the desired functionality within the scope of embodiments hereof. Further, components/modules may be located on any number of servers or client computing devices. By way of example only, the search engine 112 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The computing device 110 and the search engine 112 shown in FIG. 1 may be any type of computing device, such as, for example, mobile computing device 700 described below with reference to FIG. 7. By way of example only and not limitation, each of the computing device 110 and the search engine 112 may be a personal computer, desktop computer, laptop computer, handheld device, mobile handset, game console, consumer electronic device, or the like. It should be noted, however, that embodiments are not limited to implementation on such computing devices, but may be implemented on any of a variety of different types of computing devices within the scope of embodiments hereof.

The computing device 110 shown in FIG. 1 may be a mobile computing device, such as a mobile telephone. It will be understood by those of ordinary skill in the art that the mobile computing device 110 is merely exemplary and that the computing device 110 may be any type of computing and/or communication device, such as a personal computer, textual communication device, or the like. The computing device 110 includes a search selector 110a and a display screen 110b. The search selector 110a shown in FIG. 1 is a single hardware button that, when selected, triggers an indication to the search engine 112 that a search is desired. While shown in FIG. 1 as a hardware search selector, the search selector 110a may be a software search selector, a hardware search selector, or a combination hardware and software search selector, as desired.

The display screen 110b is configured to display information to the user of the computing device 110, for instance, information relevant to communications initiated by and/or received by the computing device 110, typing activity, browsing activity, content items, and the like. For instance, the display 110b may render the prefix of a query that is being entered by the user. In some embodiments, the computing device 110 periodically sends the prefix of the query and the location of the user to the search engine 112. In turn, the computing device 110 receives query completions from the search engine 112. A user of the computing device 110 may select one of the query completions and initiate a search with the search selector 110a. Embodiments of the invention are not intended to be limited to visual display but rather may also include audio presentation, combined audio/visual presentation, and the like.

It will be understood by those of ordinary skill in the art that computing system environment 100 is merely exemplary. While the search engine 112 is illustrated as a single unit, one skilled in the art will appreciate that the search engine 112 is scalable. For example, the search engine 112 may in actuality include a plurality of computing devices in communication with one another. Moreover, the data store 114, or portions thereof, may be included within the search engine 112 and/or the computing device 110 as a computer-storage medium. The single unit depictions are meant for clarity, not to limit the scope of embodiments in any form.

As shown in FIG. 1, the search engine 112 may include, among other things, a completion component 112a. In some embodiments, the query completion component 112a may be implemented as a stand-alone application. In other embodiments, the query completion component 112a may be integrated directly into the operating system of the computing device 110. It will be understood by those of ordinary skill in the art that the query completion component 112a illustrated in FIG. 1 is exemplary in nature and in number and should not be construed as limiting. Any number of components may be employed to achieve the desired functionality within the scope of embodiments hereof.

The query completion component 112a may receive the prefix and location from the computing device 110. The query completion component 112a is configured to provide completions to the user as the user incrementally enters a query. In some embodiments, the search engine 112 incrementally receives portions of a query as the user enters each character. New query completions may be received after each keystroke or other input by the user. For instance, suppose the user wishes to enter the search query "coffee." The prefixes received by the search engine 112 as the user types each character would include "c," "co," "cof," "coff," "coffe," and "coffee."

In some embodiments, time-based approaches may be employed to provide query prefixes to the search engine 112. For instance, the search engine 112 may continuously receive a query prefix each time a predetermined period of time lapses, whether or not the query prefix has changed during that time period. In other embodiments, the query prefix may be analyzed at predetermined time intervals for changes and each time a change is identified, the search engine 112 receives the new query prefix. Any and all such variations are contemplated to be within the scope of embodiments of the invention.

As each prefix of the query is incrementally received while the user is entering the search query, the query completion component 112a identifies query completions that may be provided to the user. The query completions may be identified from names of entities stored in data store 114. Generally, the query completion component 112a may attempt to determine what query the user intends to submit before the user actually completes entering the query and submits the completed search query. Additionally, the query completion component 112a may attempt to provide ranked query completions related to what the user is entering and where the user is currently located.

The data store 114 is configured to store information associated with various entities. The information may include, without limitation, entity name, entity popularity, entity reviews, entity address, links to uniform resource locators (URLs) for the entity, and the like. In some embodiments, the data store 114 is searchable by the query completion component 112a for one or more matches to the prefix and location data. The matches may include partial matches. It will be understood and appreciated by those of ordinary skill in the art that the information stored in association with the data store 114 may be configurable and stored in a relational database format or a hierarchical format. In some embodiments, the records of the database are tries that are associated with various locations of the world. The content and volume of such information are not intended to limit the scope of embodiments of the invention in any way. Further, though illustrated as a single, independent component, the data store 114 may, in fact, be a plurality of storage devices, for instance a database cluster, portions of which may reside on the search engine 112, the computing device 110, another external computing device (not shown), and/or any combination thereof.

In some embodiments the data store 114 may include information on entities located throughout the world. The location of the entities may be divided in several levels. Each of the levels includes tiles that group entities. At each level the geographic scope of the tiles are reduced. Accordingly, each entity, or point-of-interest (POI), belongs to a specific tile at each level. In other words, all the entities are represented at each level. But each tile may include a variable number of entities. In some embodiments, the average density (number of entities per mile) may be higher when levels have fewer tiles. Higher levels, e.g., levels with smaller identifiers may contain fewer tiles than lower levels, e.g., levels with large identifiers. Multiple levels may be used to divide dense areas into smaller regions to minimize the number of ranking calculations required for a specific coordinate entry. For an incoming prefix and a coordinate pair, the following may be carried out by the query completion component 112a. The query completion component 112a maps the coordinate pair to a specific tile ID in a first level. If the first level contains more matching entries than a specific threshold or range, e.g., 50 matching entries as a ceiling, the query completion component 112a selects a lower level and performs this check until the threshold is satisfied or until it reaches the lowest level. At the appropriate level, the trie will return entities that start with the given prefix. If the number of entities is below a specific limit, e.g., 50, the query completion component 112a may include entities from neighboring tiles (N, S, E, W, NE, NW, SE, and SW) of the tile having the location. The query completion component 112a may then mark each retrieved entity with a rank based on longitude, latitude, popularity, etc., provided with each matching entity. The top 8 entities with the highest ranks are returned by the query completion component 112a. If fewer than 8 entities are returned, the query completion may update the location with a city, state, or country of the matching entities to locate additional entities that match the prefix or that contain the prefix. In other embodiments, the data store 114 may include popularity tries that store the most popular entities for a city, state or country. The query completion may first look for the additional entities based on the city popularity trie, state popularity trie, or the country popularity trie.

Accordingly, the query completion component 112a may consider the density of the entities at each level based on prefix and location matches. In turn, the query completion component 112a may select the best matches as query completions when a threshold number of matches are found. In certain embodiments, the data store 114 may include tries that include a level identifier, tile identifier, and entity name. The trie returns a variable number of entity names per key (level identifier, tile identifier, and prefix) and also returns the number of entities available for a key within constant time. Each trie may include information like longitude, latitude, popularity, etc., required to rank the entities.

Components of the computing device 110 and the search engine 112 (not shown for clarity) may include, without limitation, a processing unit, internal system memory, and a suitable system bus for coupling various system components, including one or more databases for storing information (e.g., files and metadata associated therewith). Each of the computing device 110 and the search engine 112 typically includes, or has access to, a variety of computer-readable media. By way of example, and not limitation, computer-readable media may include computer-storage media and communication media. In general, communication media enable each server to exchange data via a network, e.g., network 116. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media include wired media such as a wired network or direct-wired connection, and wireless media such as acoustic, RF, infrared, and other wireless media. Combinations of any of the above also may be included within the scope of computer-readable media.

Embodiments of the invention provide query completions in response to prefixes received from the user. The query completions are transmitted to the computing device for display to the user. The user may ignore the query completion or initiate a search utilizing one or more of the query completions. The query completions may include contact information for the entities included in the query completion.

Figure 2:
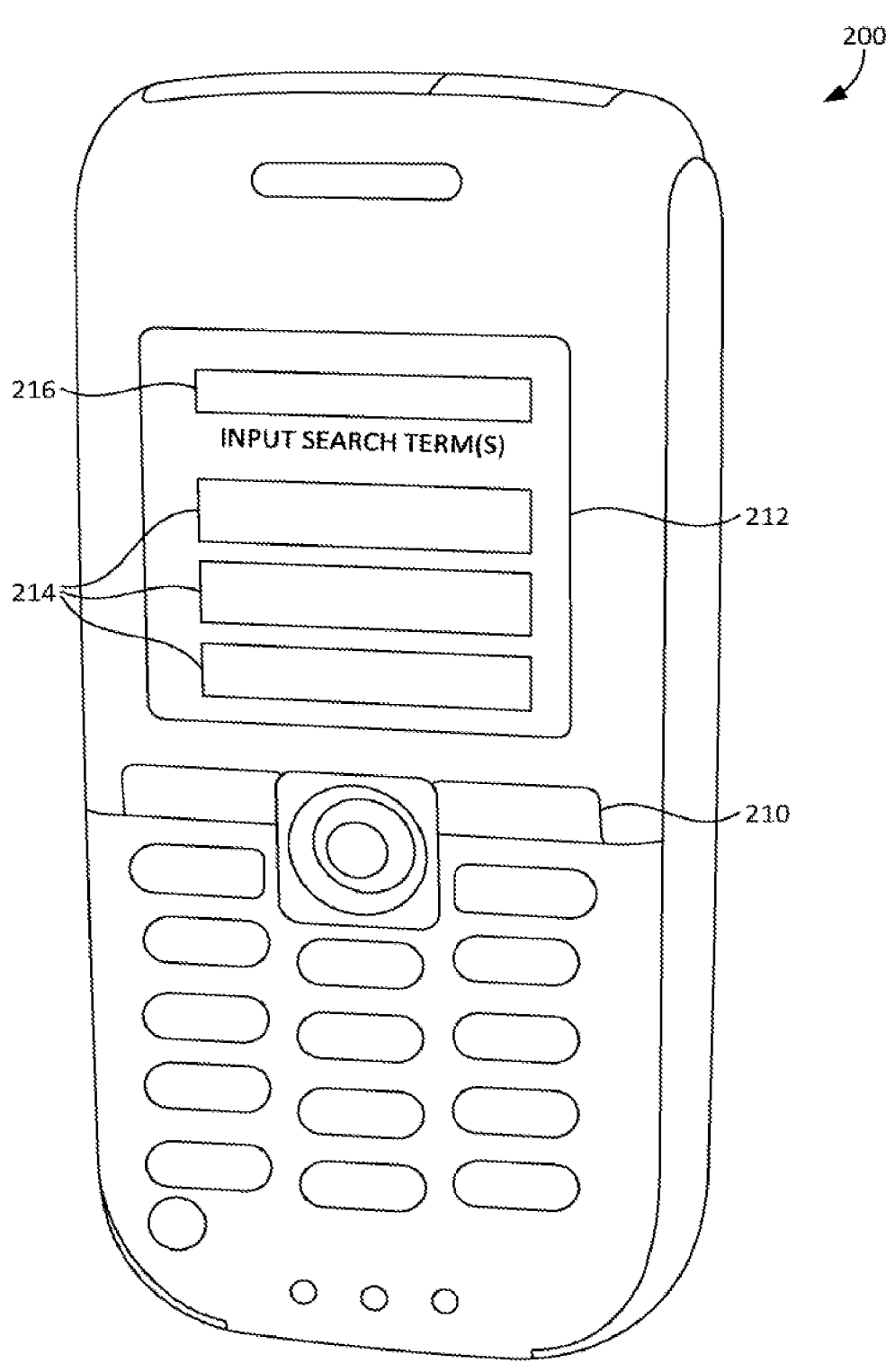
FIG. 2 is a schematic diagram of an exemplary computing device including a user interface on which query completions may be presented, the computing device being suitable for implementing embodiments of the invention.

FIG. 2 is a schematic diagram of an exemplary computing device including a user interface on which query completions may be presented, the computing device being suitable for implementing embodiments of the invention. As shown in FIG. 2, the exemplary computing device 200 includes a search selector 210, and a user interface 212 on which query completions 214 may be selected. In the illustrated embodiment, the search selector 210 is a hardware-based search selector. It will be understood by those of ordinary skill in the art that the search selector 210 may alternatively be a software-based search selector and/or a combination of a hardware-based and software-based search selector in accordance with embodiments hereof. In accordance with the embodiments of the invention, query completions 214 are presented in association with the user interface 212 while the user is inputting the query prefixes 216.

Upon receiving an indication that the search selector 210 has been selected, one or more search results are presented in association with the user interface 212 of the computing device 200. The search results are presented based on the selected query terms.

The graphical user interface displayed on the computing device may include the query completions received from the search engine. The graphical user interface may also include contact information, like address and phone number of the entities that match the prefix and location received from the computing device.

Figure 3:
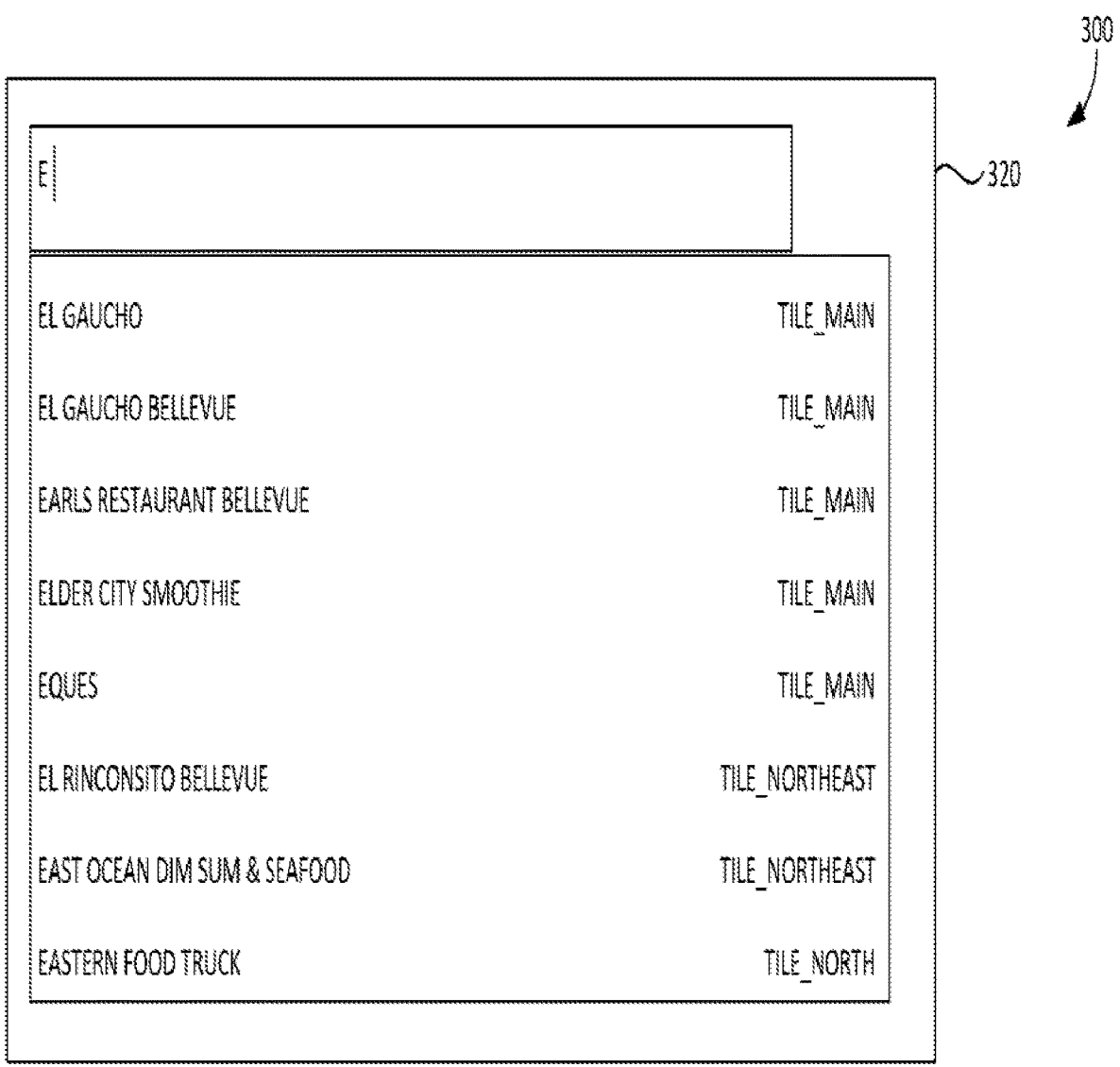
FIG. 3 is a graphical user interface illustrating a display of the query completions in accordance with embodiments of the invention.

FIG. 3 is a graphical user interface 300 illustrating a display of the query completions in accordance with embodiments of the invention. The user may enter a prefix, like "E" into a text field 320 of the graphical user interface. The user may utilize an input device like a keyboard, keypad, or touch screen to enter the prefix. In turn, the computing device may receive entities that match the prefix and that are near the current location of the user. The computing device receives the query completions of the prefix and current location. The query completions may include "EL GAUCHO," "EASTERN FOOD TRUCK," etc.

Figure 4:
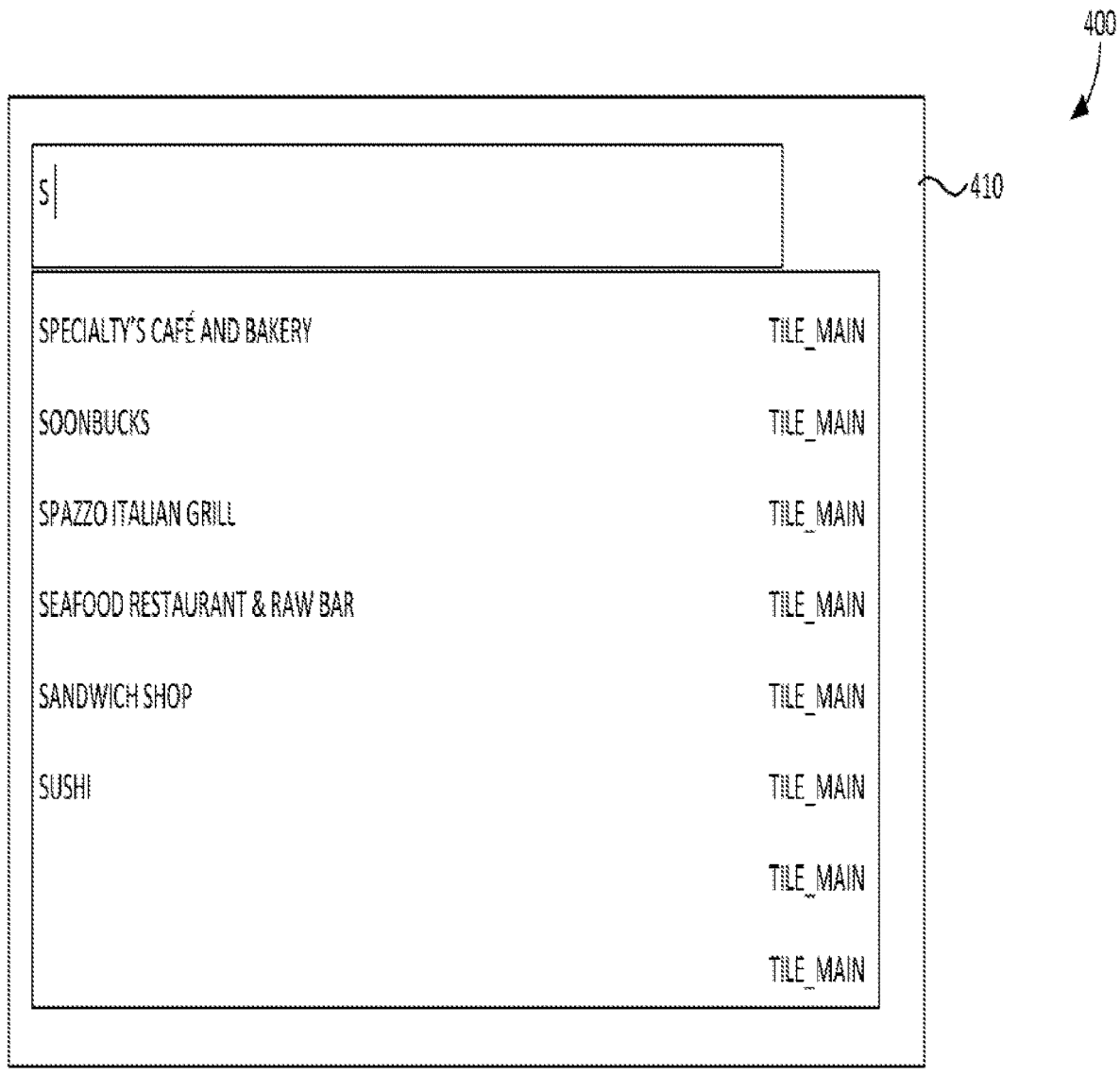
FIG. 4 is another graphical user interface illustrating a display of the query completions in accordance with embodiments of the invention.

FIG. 4 is another graphical user interface 400 illustrating a display of the query completions in accordance with embodiments of the invention. The user may enter a prefix, like "S" into a text field 410 of the graphical user interface. The user may utilize an input device like a keyboard, keypad, or touch screen to enter the prefix. In turn, the computing device may receive entities that match the prefix and that are near the current location of the user. The computing device receives the query completions of the prefix and current location. The query completions may include "SOONBUCKS," "SUSHI," "SANDWICH SHOP," etc.

In some embodiments, the entities included in the data store may be located anywhere in the world. A map structure may be utilized to create levels and tiles for storing the entity data. At a first level, the entity data may be divided among 4 tiles. At the subsequent level, the entity data may be divided among 16 tiles. At a final level, the entity data may be divided among 64 tiles. This allows the search engine to efficiently identify matches as the user provides the prefix data for the query.

Figure 5:
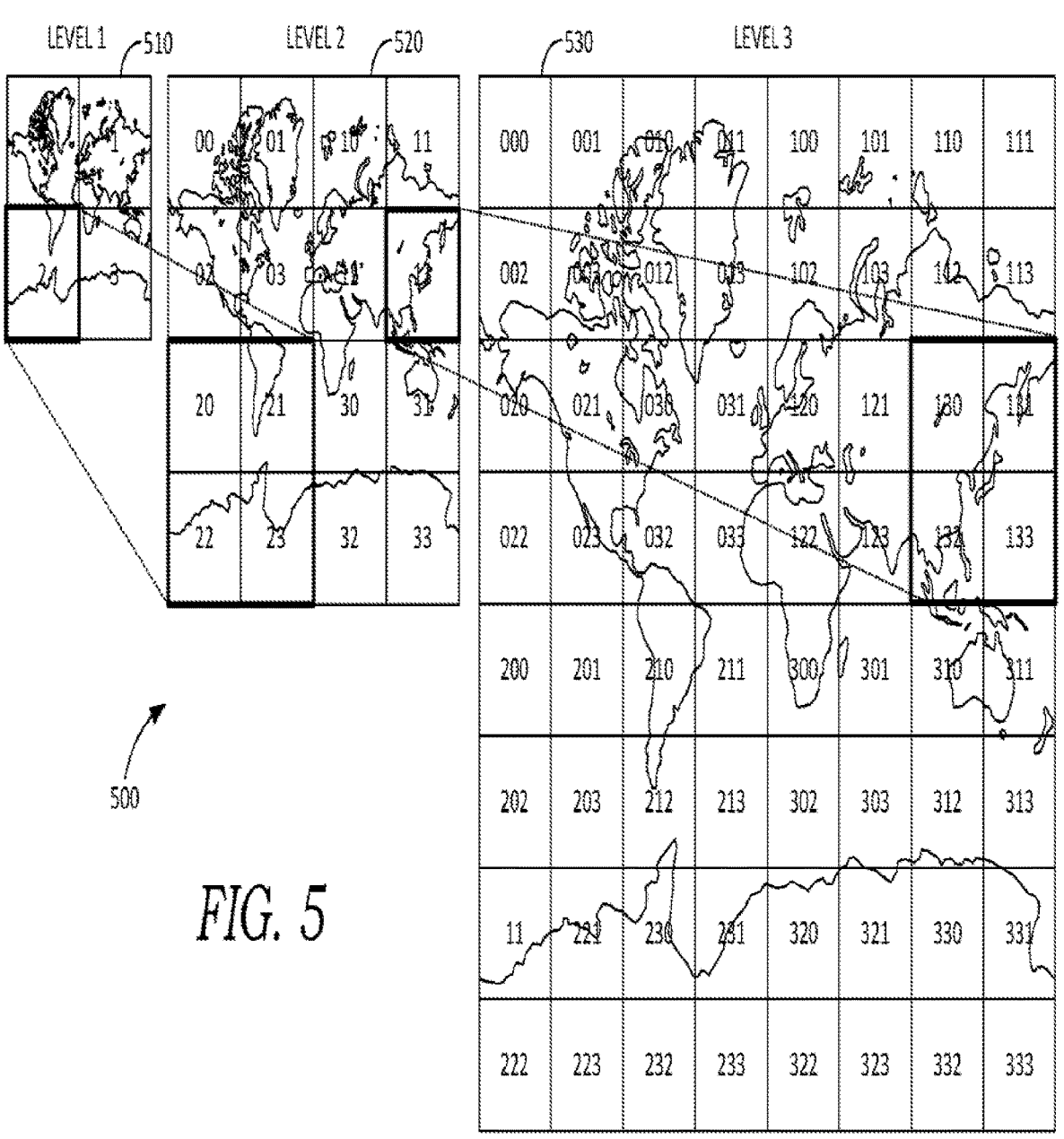
FIG. 5 is a map diagram illustrating exemplary levels and tiles for the database utilized in accordance with embodiments of the invention.

FIG. 5 is a map diagram illustrating exemplary levels and tiles for the database 500 utilized in accordance with embodiments of the invention. The database may include several levels: a first level 510, a second level 520, and a final level 530. Each level has varying numbers of tiles. With each tile, entities that are within the geographic region associated with the tile are stored with the corresponding tile identifier. Thus, at the each lower level, the number of entities per tile may decrease. This structure allows the search engine to quickly move to a new level, if the previous level returned more than the threshold number of matches. Once the appropriate level is found, the tile corresponding to the location of the user is identified. In turn, the level id, tile id, and prefix are utilized to return a specified number of matches to the prefix received from the user. The matches are then ranked and the top results are provided to the user as query completions.

In other embodiments, the server device executing the search engine also executes a query completion component. The query completion component receives the prefix and location data from the computing device. The prefix and location data are utilized by the server device to identify entities that are close to the user. In turn, the matching entities are transmitted to the computing device for display to the user.

Figure 6:
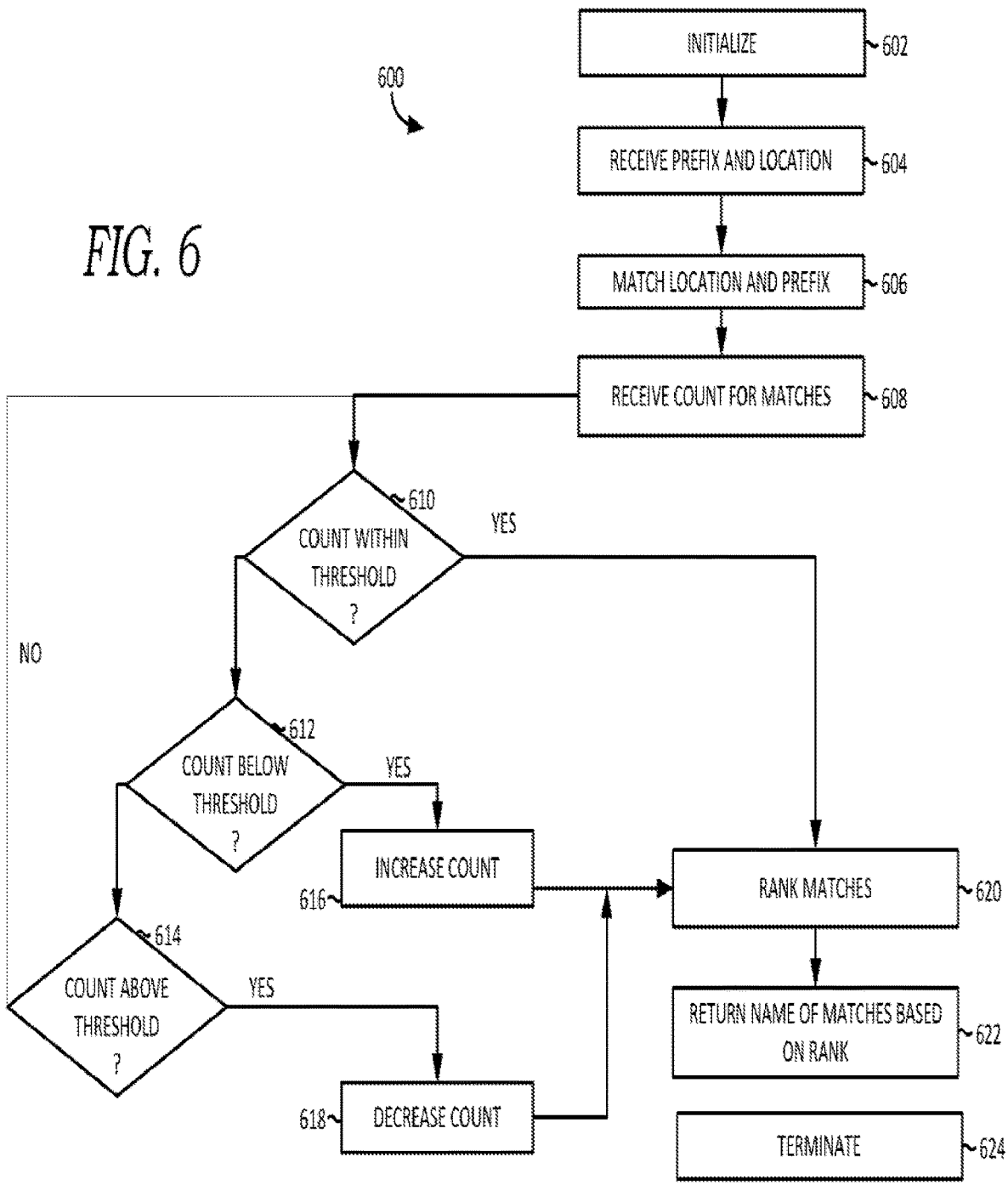
FIG. 6 is a logic diagram illustrating an exemplary method to provide query completions in accordance with embodiments of the invention.

FIG. 6 is a logic diagram illustrating an exemplary method to provide query completions in accordance with embodiments of the invention. The method initializes in step 602. In step 604, the server device may receive a prefix and location information. The prefix and location information may be provided by a computing device utilized by the user. In turn, the server device, in step 606, may match the location and prefix with names and locations of entities stored in a database. In one embodiment, the database may store the entities as tries. The tries may include names for entities that match the prefix.

The server device receives a count of the matches to the location and prefix, in step 608. In step 610, the server device may determine whether the count is within a predetermined range. In one embodiment, the predetermined range is between 50 and 51. In another embodiment, the predetermined range is between 10 and 20.

If the count is not within the predetermined range, the server device checks, in step 612, whether the count is below a lower threshold of the predetermined range. If the count is below the predetermined range, the server device, in step 616, increases the count by increasing a radius utilized to identify the matches to the location.

If the count is not below the lower threshold of the predetermined range, the server device, in step 614, checks whether the count is above an upper threshold of the predetermined range. If the count is above the predetermined range, the server device, in step 618, reduces the count by reducing a radius utilized to identify the matches to the location.

In turn, when the count is within the predetermined range, the server device, in step 620, ranks the matches. The rank calculated by the server device may be based on popularity of the entities. The popularity may be based on user reviews, expert reviews, or frequency of appearance in search logs. The rank may also be based on distances a user that provided the prefix is currently from the entities.

In step 622, the server device may return the names of the entities that include the prefix based on the rank. The server device may select 8 entities with the highest ranks and return them as query completion for the prefix. The 8 entities are transmitted to a user. In one embodiment, the entities may include entities gathered from a popularity trie. The method terminates in step 624.

Accordingly, embodiments of the invention return query completions that are based on the current location of the user. The query completions are transmitted to the user as the user enters a query in a computing device. The query completions may include contact information that is utilized by the user to determine the distance an entity is currently from the user. For instance, the query completions may include the number of miles or kilometers an entity is located from the current location of the user.

Figure 7:
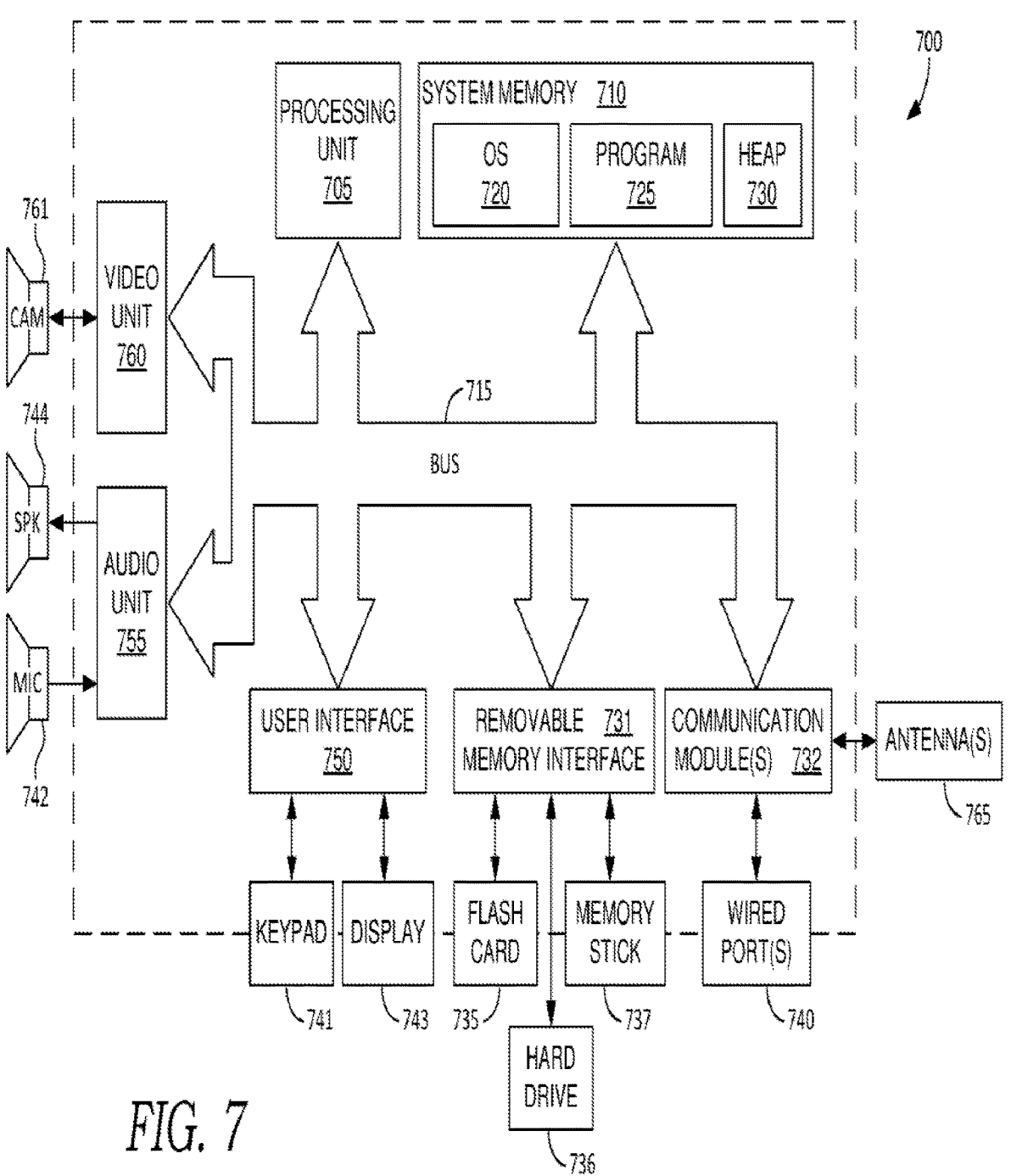
FIG. 7 is a block diagram showing an exemplary computing system environment suitable for implementing embodiments of the invention.

FIG. 7 is a block diagram showing an exemplary computing system environment suitable for implementing embodiments of the invention. With reference to FIG. 7, an exemplary device for implementing aspects of the subject matter described herein includes a mobile computing device 700. Though embodiments of the invention are not limited to implementation on mobile computing devices, FIG. 7 illustrates an example of a suitable mobile computing device 700 on which aspects of the subject matter described herein may be implemented. The mobile computing device 700 is only one example of a device and is not intended to suggest any limitation as to the scope of use or functionality of aspects of the subject matter described herein. Neither should the mobile computing device 700 be interpreted as having any dependency or requirement relating to any one or combination of components illustrated in the exemplary mobile computing device 700.

In some embodiments, the mobile computing device 700 comprises a cell phone, a handheld device that allows voice communications with others, some other voice communications device, or the like. In these embodiments, the mobile computing device 700 may be equipped with a camera for taking pictures, although this may not be required in other embodiments. In other embodiments, the mobile computing device 700 comprises a personal digital assistant (PDA); handheld gaming device; notebook computer; printer; appliance including a set-top, media center, or other appliance; other mobile devices; or the like. In yet other embodiments, the mobile computing device 700 may comprise devices that are generally considered nonmobile such as personal computers, servers, or the like.

Components of the mobile computing device 700 may include, but are not limited to, a processing unit 705, system memory 710, and a bus 715 that couples various system components including the system memory 710 to the processing unit 705. The bus 715 may include any of several types of bus structures including a memory bus, memory controller, a peripheral bus, and a local bus using any of a variety of bus architectures, and the like. The bus 715 allows data to be transmitted between various components of the mobile computing device 700.

The mobile computing device 700 may include a variety of computer-readable media. Computer-readable media can be any available media that can be accessed by the mobile computing device 700 and includes both volatile and non-volatile media, and removable and non-removable media. By way of example, and not limitation, computer-readable media may comprise computer storage media and communication media. Computer storage media include volatile and nonvolatile, removable and nonremovable media implemented in any method or technology for storage of information such as computer-readable instructions, data structures, program modules, or other data. Computer storage media include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by the mobile computing device 700.

Communication media may include any information delivery media, typically embodied in computer-readable instructions, data structures, program modules, and/or may include other data in a modulated data signal such as a carrier wave or other transport mechanism. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, Wi-Fi, WiMAX, and other wireless media. Combinations of any of the above also may be included within the scope of computer-readable media.

The system memory 710 includes computer storage media in the form of volatile and/or nonvolatile memory and may include read only memory (ROM) and random access memory (RAM). On a mobile computing device such as a cell phone, operating system code 720 is sometimes included in ROM although, in other embodiments, this is not required. Similarly, application programs 725 are often placed in RAM although again, in other embodiments, application programs may be placed in ROM or in other computer-readable memory. The heap 730 provides memory for the states associated with the operating system 720 and/or the application programs 725. For example, the operating system 720 and application programs 725 may store variables and data structures in the heap 730 during their operations.

The mobile computing device 700 may also include other removable/non-removable, volatile/nonvolatile memory. By way of example, FIG. 7 illustrates a flash card 735, a hard disk drive 736, and a memory stick 737. The hard disk drive 736 may be miniaturized to fit in a memory slot, for example. The mobile computing device 700 may interface with these types of non-volatile removable memory via a removable memory interface 731, or may be connected via a universal serial bus (USB), IEEE 1934, one or more of the wired port(s) 740, or antenna(s) 765. One of the antennas 765 may receive GPS data. In these embodiments, the removable memory devices 735-737 may interface with the mobile device via the communications module(s) 732. In some embodiments, not all of these types of memory may be included on a single mobile device. In other embodiments, one or more of these and other types of removable memory may be included on a single mobile device.

In some embodiments, the hard disk drive 736 may be connected in such a way as to be more permanently attached to the mobile computing device 700. For example, the hard disk drive 736 may be connected to an interface such as parallel advanced technology attachment (PATA), serial advanced technology attachment (SATA) or otherwise, which may be connected to the bus 715. In such embodiments, removing the hard drive may involve removing a cover of the mobile computing device 700 and removing screws or other fasteners that connect the hard drive 736 to support structures within the mobile computing device 700.

The removable memory devices 735-737 and their associated computer storage media, described above and illustrated in FIG. 7, provide storage of computer-readable instructions, program modules, data structures, and other data for the mobile computing device 700. For example, the removable memory device or devices 735-737 may store images taken by the mobile computing device 700, voice recordings, contact information, programs, data for the programs, and so forth.

A user may enter commands and information into the mobile computing device 700 through input devices such as a keypad 741 and the microphone 742. In some embodiments, the display 743 may be a touch-sensitive screen and may allow a user to enter commands and information thereon. The keypad 741 and display 743 may be connected to the processing unit 705 through a user input interface 750 that is coupled to the bus 715, but may also be connected by other interface and bus structures, such as the communications module(s) 732 and wired port(s) 740.

A user may communicate with other users via speaking into the microphone 742 and via text messages that are entered on the key pad 741 or a touch-sensitive display 743, for example. The audio unit 755 may provide electrical signals to drive the speaker 744 as well as receive and digitize audio signals received from the microphone 742.

The mobile computing device 700 may include a video unit 760 that provides signals to drive a camera 761. The video unit 760 may also receive images obtained by the camera 761 and provide these images to the processing unit 705 and/or memory included on the mobile device 700. The images obtained by the camera 761 may comprise video, one or more images that do not form a video, or some combination thereof.

The communication module(s) 732 may provide signals to and receive signals from one or more antenna(s) 765. One of the antenna(s) 765 may transmit and receive messages for a cell phone network. Another antenna may transmit and receive Bluetooth messages. Yet another antenna (or a shared antenna) may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile computing device 700 may connect to one or more remote devices. The remote devices may include a personal computer, a server, a router, a network PC, a cell phone, a peer device or other common network node, and typically includes many or all of the elements described above relative to the mobile device 700.

Figure 8:
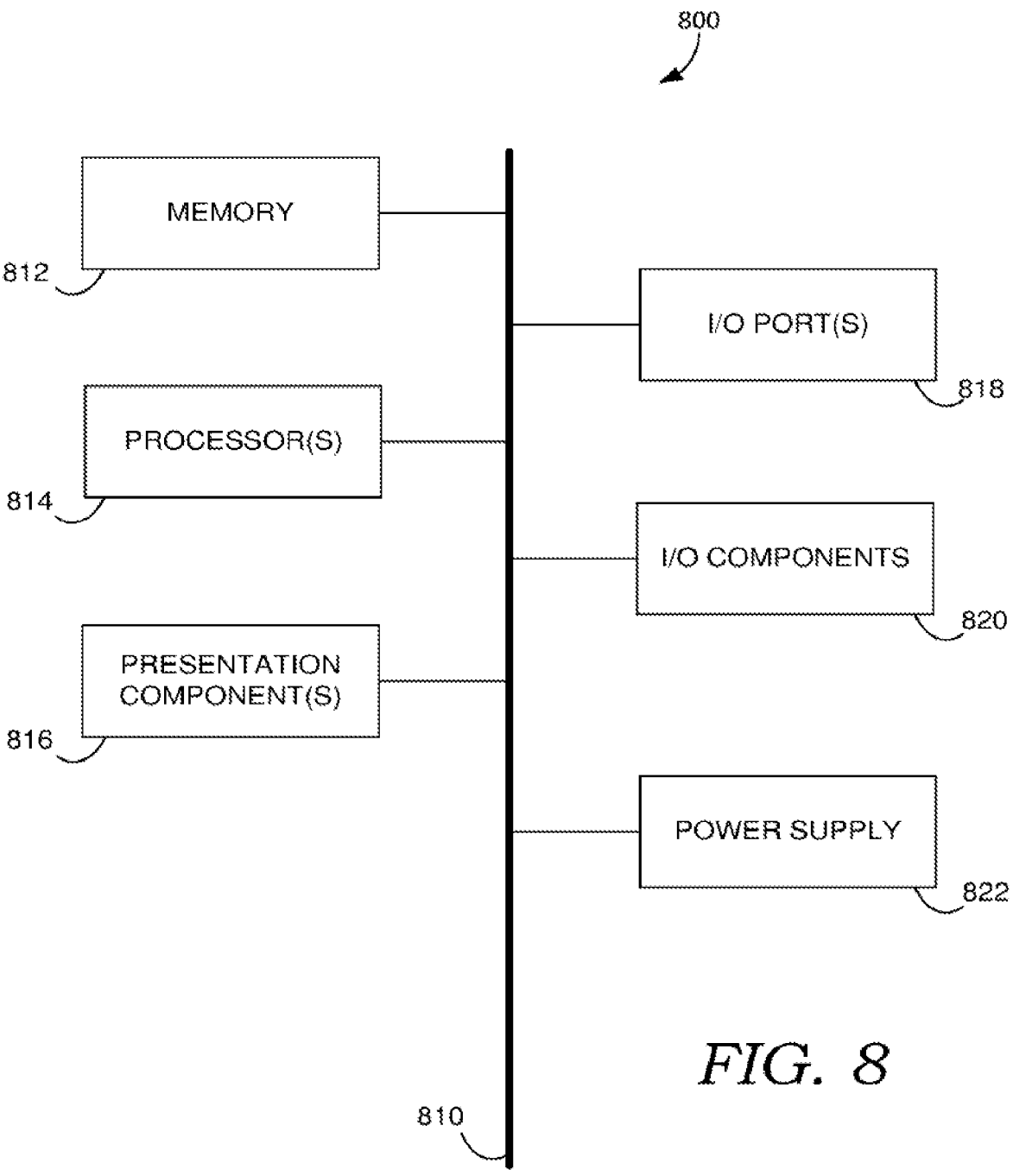
FIG. 8 is a block diagram showing another exemplary computing system environment suitable for implementing embodiments of the invention.

FIG. 8 is a block diagram showing another exemplary computing system environment suitable for implementing embodiments of the invention. The exemplary operating environment for implementing embodiments of the invention is shown and designated generally as computing device 800. The computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 8, the computing device 800 includes a bus 810 that directly or indirectly couples the following devices: memory 812, one or more processors 814, one or more presentation components 816, input/output ports 818, input/output components 820, and an illustrative power supply 822. The bus 810 represents what may be one or more busses (such as an address bus, data bus, or combination thereof).

Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 8 is merely illustrative of an exemplary computing device that can be used in connection with one or more embodiments of the invention. Distinction is not made between such categories as "workstation," "server," "laptop," "handheld device," etc., as all are contemplated within the scope of FIG. 8 and reference to "computing device."

The computing device 800 typically includes a variety of computer-readable media. Computer-readable media can be any available media that can be accessed by computing device 800 and include both volatile and nonvolatile media, removable and nonremovable media. By way of example, and not limitation, computer-readable media may comprise computer storage media and communication media. Computer storage media include volatile and nonvolatile, removable and nonremovable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 812 includes computer-storage media in the form of volatile and/or nonvolatile memory. The memory may be removable, nonremovable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

The I/O ports 818 allow computing device 800 to be logically coupled to other devices including the I/O components 820, some of which may be built in. Illustrative components include a microphone, joystick, game pad, satellite dish, scanner, printer, wireless device, etc.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, handheld or laptop devices, multiprocessor systems, micro-controller-based systems, set-top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

In summary, a server device identifies query completions by accessing a database storing entity data based on maps having varying levels and tiles. Each tile on each level represents distinct geographical regions. The levels contain the same number of entities but each level includes a different number of tiles. More tiles yield fewer entities per tile. In one embodiment, the database may store a count on the number of entities per tile.

For instance, if the user types in a short prefix a higher level may not be the best place to start comparisons because the server device may receive a large data set. The server device may increase or decrease levels based on the size of the data set returned by the database. The server device may decrease levels until the tile density is low enough. In certain embodiments, the database includes tries. The tries may store level id, tile id, and entity name. The tries are a data structure that take a prefix and return completions that begin with the prefix within the corresponding level and tile.

In one embodiment, a map may include three levels. In the first level, the matching tile may include over 3,000 matching entities. In a subsequent level, the matching tile may have 500 matching entities. In the final level, the matching tile may include less than 50 matching entities. In turn, the server device receives and processes the matching entities associated with the matching entities. Because the number of entities is below the threshold, the server device may include matching entities from neighboring tiles by expanding the radius of the matching location to include neighboring tiles. The entities may be ranked by the server device based on distance, popularity, and user rating. The top 8 entities, including address and distance from user, may be returned to the user as query completions. The query completions include a reasonable number of matches to minimize loss of relevance by relaxing the threshold to include neighboring tiles.

The embodiments of the invention have been described in relation to a particular exemplary search engine and computing device, which are intended in all respects to be illustrative rather than restrictive. Alternative embodiments will become apparent to those of ordinary skill in the art to which the invention pertains without departing from its scope.

What is claimed is:

1. A computer-implemented method comprising:
receiving a query prefix including a set of characters provided by a user and a location associated with a device operated by the user;
matching the location and the query prefix to a first set of entities included in a database to select a first tile of a set of tiles, the database including a plurality of levels where levels of the plurality of levels include all entities stored in the database and a first level is divided into the set of tiles, where the first tile of the set of tiles represents a geographic area and stores at least one entity of the first set of entities in a trie including a level identifier, a tile identifier, and an entity name;
selecting a second tile of the set of tiles to search based on a number of entities within the first set of entities being below a threshold, where the second tile represents a second geographic area that includes at least a portion of the geographic area or is adjacent to the geographic area;
matching the location and the query prefix to a second set of entities include in the second tile of the set of tiles;
generating a set of results by at least generating a ranking of entities included in the first set of entities and the second set of entities based on a set of factors, where the ranking indicates a value associated with the entities and the set of factors includes at least one of: a distance relative to the location, a popularity, a set of reviews, a frequency, or a combination thereof; and
return the set of results based on ranking.

2. The computer-implemented method of claim 1, wherein selecting the second tile of the set of tiles to search based on the number of entities further comprises selecting the second tile based on the number of entities being below a threshold.

3. The computer-implemented method of claim 1, wherein the set of factors includes at least one of: distance from the location, popularity, reviews, and frequency.

4. The computer-implemented method of claim 3, wherein the database includes a set of popularity tries which store popular entities relative to other entities associated with the first tile.

5. The computer-implemented method of claim 4, wherein the set of popularity tries is searched for a match to the location and the query prefix prior to the trie.

6. The computer-implemented method of claim 1, wherein the first level and a second level of the plurality of levels include a different number of tiles.

7. The computer-implemented method of claim 6, wherein the set of tiles associated with the first level represent a larger geographic scope then a second set of tiles associated with the second level.

8. The computer-implemented method of claim 7, wherein the first level and the second level include data representing the first set of entities and the second set of entities.

9. The computer-implemented method of claim 7, wherein the set of tiles and the second set of tiles include a different number of entities.

10. One or more computer storage media storing computer-useable instructions that, when used by one or more computing devices, cause the one or more computing devices to perform operations comprising:
receiving a query prefix and a location, the query prefix including a set of characters;
determining a set of entities that match the query prefix and the location, the set of entities maintained in a database including a set of levels where levels of the set of levels include data representing all entities stored in the database and a first level of the set of levels is divided into a plurality of tiles, where a first tile of the plurality of tiles represent a geographic area and stores at least one entity in a trie including a level identifier, a tile identifier, and an entity name, where the trie is stored in a data structure that is queried to obtain entities of the set of entities;
selecting a second level of the set of levels to search based on a number of entities within the set of entities being below a threshold, where the second level is selected to adjust a number of candidate entities such that the number of candidate entities are above the threshold;
determining a second set of entities by at least matching the location and the query prefix to the second set of entities included in a second tile within the second level of the database; and
returning a set of results that includes a ranking of entities included in the second set of entities based on a set of factors.

11. The one or more computer storage media of claim 10, wherein the query prefix and the location are received from a mobile device.

12. The one or more computer storage media of claim 11, wherein returning the set of results includes transmitting the set of results to the mobile device.

13. The one or more computer storage media of claim 10, wherein the second set of entities includes names that are partial matches to the query prefix.

14. The one or more computer storage media of claim 10, wherein the set of factors includes distance, popularity, reviews, and frequency.

15. The one or more computer storage media of claim 14, wherein the first level and the second level contain a different number of tiles.

16. The one or more computer storage media of claim 10, wherein a first geographic scope of the second tile is less than a second geographic scope of the first tile.

17. The one or more computer storage media of claim 16, wherein the first tile and the second tile include a different number of entities.

18. The one or more computer storage media of claim 17, wherein the second tile includes a popularity trie which stores popular entities relative to other entities associated with the second tile.

19. A system, comprising:
a processor; and
a memory coupled to the processor and storing instructions that, when executed by the processor, perform operations, comprising:
receiving a set of characters representing a query prefix and a location, associated with a user;
matching a first set of entities included in a database to the query prefix and the location, the database including a set of levels where levels of the set of levels include entities stored in the database and a first level of the set of levels is divided into a plurality of tiles that represent a geographic area and stores a subset of entities of the first set of entities in a trie including a level identifier, a tile identifier, and an entity name, wherein the first set of entities are maintained within a first tile of the plurality of tiles;

based on a number of entities within the first set of entities, matching a second set of entities to the location and the query prefix included in a second tile within the first level associated with a second geographic area associated with the location; and generating a ranking of the second set of entities based on geospatial coordinates and a set of factors including distance, popularity, reviews, frequency, or a combination thereof; and returning the second set of entities and the ranking and an indication that the second tile associated with the second geographic area was searched to obtain the second set of entities.

20. The system of claim 19, wherein the first tile and the second tile represent contiguous geographic area with a radius of the location.

* * * * *